United States Patent [19]

Grube et al.

[11] Patent Number: 5,473,605

[45] Date of Patent: Dec. 5, 1995

[54] METHOD FOR A COMMUNICATION UNIT TO PARTICIPATE IN MULTIPLE CALLS

[76] Inventors: Gary W. Grube, 561 Chateaux Bourne, Barrington, Ill. 60010; Brian K. Bunkenburg, 3416 N. Racine, Chicago, Ill. 60657; Marc C. Naddell, 2904 Heatherwood Dr., Schaumburg, Ill. 60193

[21] Appl. No.: 396,404

[22] Filed: Feb. 28, 1995

[51] Int. Cl.⁶ .................................................. H04B 7/204
[52] U.S. Cl. ..................... 370/62; 370/95.1; 340/825.47; 455/15; 455/34.1; 455/54.1; 379/58; 379/202
[58] Field of Search .......................... 370/62, 95.1, 95.3; 379/58, 59, 60, 62, 63, 158, 202, 204, 205; 455/15, 17, 33.1, 34.1, 49.1, 53.1, 54.1, 54.2, 57.1, 58.2; 340/825.47

[56] References Cited

U.S. PATENT DOCUMENTS

| | | | |
|---|---|---|---|
| 4,649,567 | 3/1987 | Childress | 455/17 |
| 4,754,450 | 6/1988 | Lynk, Jr. et al. | 370/29 |
| 5,034,947 | 7/1991 | Epps | 370/62 |
| 5,224,094 | 6/1993 | Maher | 370/62 |
| 5,255,308 | 10/1993 | Hashimoto et al. | 379/58 X |
| 5,404,571 | 4/1995 | Makowski | 455/33.1 |

Primary Examiner—Douglas W. Olms
Assistant Examiner—Russell W. Blum
Attorney, Agent, or Firm—Christopher P. Moreno

[57] ABSTRACT

While participating in a group call on a first wireless communication resource 114, senior members 104–107 of a communication group 108 can initiate a semi-private call. A central controller 110 allocates a second wireless communication resource 115 for the semi-private call. Furthermore, executive members 106–107 can initiate an executive call to be established on a third wireless communication resource 116. Executive members can participate in the executive call, the semi-private call, and the group call, whereas senior members can participate in the semi-private call and the group call. Junior members 101–103, normally allowed to participate only in the group call, can be selected by senior members to temporarily participate in the group call and the semi-private call.

12 Claims, 3 Drawing Sheets

METHOD FOR A COMMUNICATION UNIT TO PARTICIPATE IN MULTIPLE CALLS

FIELD OF THE INVENTION

The present invention relates generally to communication systems and, in particular, to a method for a communication unit to participate in multiple calls.

BACKGROUND OF THE INVENTION

Time division multiplexed (TDM) wireless communication systems are know to comprise a central controller that allocates a plurality of wireless communication resources, via base stations operably connected to the central controller, among a plurality of communication units. In such systems, the communication units (i.e., hand-held or in-car mobile radios) are assigned wireless communication resources in the form of a radio frequency (RF) carrier divided by time, i.e., time slots. As known in the art, the communication units are typically arranged into one or more communication groups. Such communication groups, or talk groups, allow radio users with similar work functions or goals to immediately communicate with one another.

Upon receiving a group call request from a communication unit affiliated with a communication group, the central controller allocates wireless communication resources for use by the communication group. The communication unit can then transmit voice signals via the allocated resource and any target units intended to receive the voice signals (i.e., communication group members) can monitor the allocated resource.

As noted above, it is possible for a communication unit to be associated with more than one communication group. Furthermore, such communication groups are often arranged in an hierarchical fashion. For example, in a communication system used by a law enforcement agency, all officers, from patrolmen up to the chief of police, would be included in a first communication group. A second, smaller communication group would comprise supervisory officers up to the chief. Finally, a still-smaller third communication group would include only the chief of police and his district commanders. In essence, each succeeding communication group becomes more exclusive in that fewer members are allowed to participate in group calls intended for those groups. Concurrent membership in multiple communication groups allows certain members, e.g., the chief of police, to participate in various group calls as necessary.

In current systems, however, it is not possible for a communication unit to participate in more than one group call at any time. This inability to participate in more than one talk group can be unduly burdensome on users of the system. Again using the current example, if an emergency situation arises, the chief of police may need to participate in communications with officers at the scene of the incident, and at the same time discuss strategy with the supervisory officers only. Using current systems, the chief of police would be forced to participate in communication with one group or the other, but not both talk groups at the same time. Therefore, a need exists for a method which allows communication units to participate in more than one group call at the same time.

DESCRIPTION OF A PREFERRED EMBODIMENT

Generally, the present invention provides a method for senior members and executive members of a communication group to simultaneously participate in multiple group calls. Junior members of the communication group are able to participate in a group call, but not in a semi-private call initiated, and participated in, by senior members of the communication group. Furthermore, executive members of the communication group are allowed to participate in an executive call as well as the group call and semi-private call. Junior members can be selected by senior members to temporarily participate in the group call and the semi-private call. This is accomplished by a central controller allocating wireless communication resources, particularly time slots on a frequency carrier, as requests for the group call, semi-private call, and executive call are received. In this manner, communication units are able to participate in multiple group calls.

Figure 1:
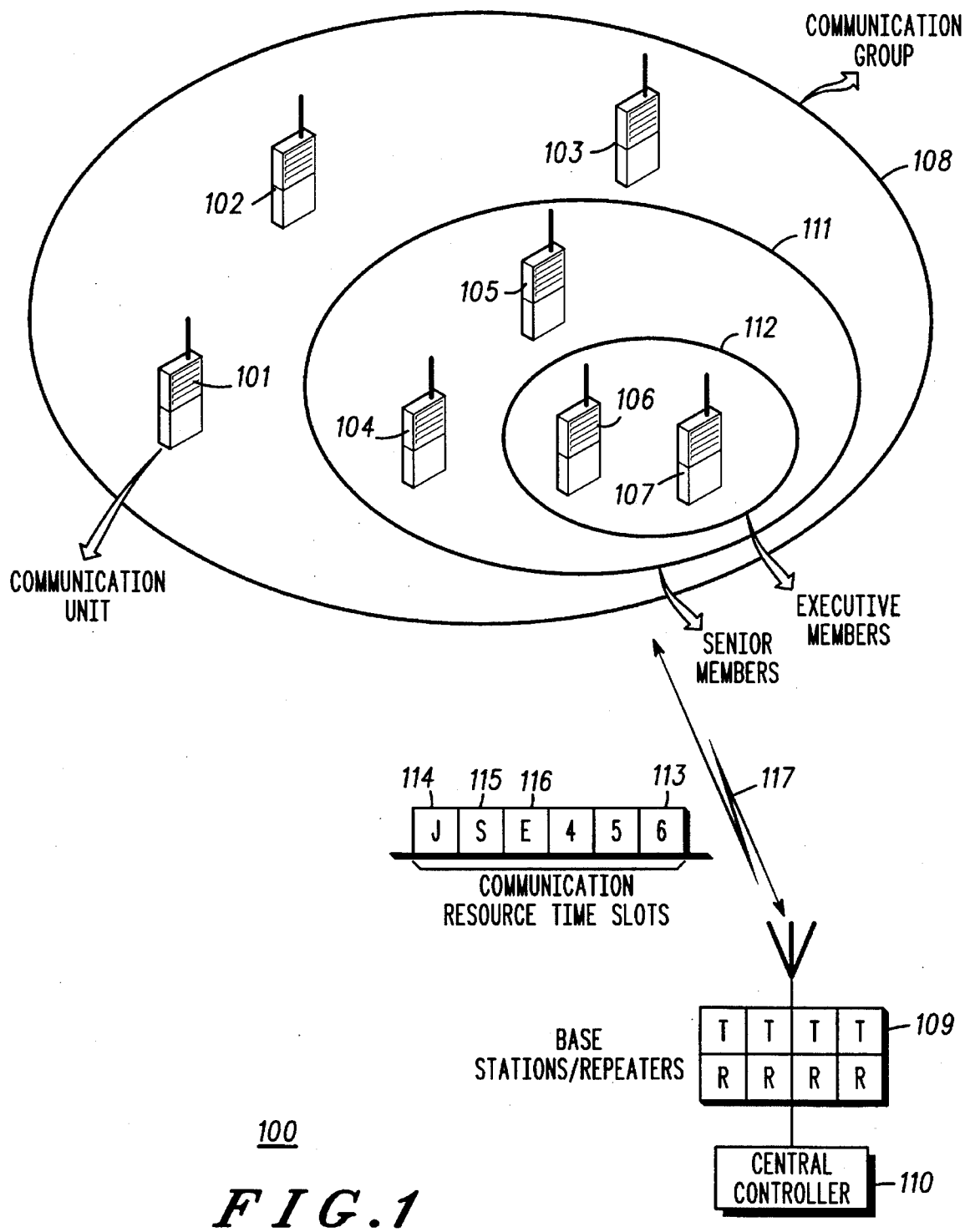
FIG. 1 is a block diagram of a TDM wireless communication system in accordance with the present invention.

The present invention can be more fully described with reference to FIGS. 1–3. FIG. 1 illustrates a TDM wireless communication system 100 that includes a plurality of communication units 101–107 arranged into a communication group 108, and a plurality of wireless communication resources 113 that are allocated, via base stations/repeaters 109, by a central controller 110. Within the communication group 108, the communication units 101–107 are further segregated into senior members 104–107 within the communication group 108, and executive members 106–107 within the senior members 104–107. Communication units not included among the senior members 104–107 are termed junior members 101–103.

The communication units 101–107 (for example, an MIRS™ portable radio by Motorola, Inc.) provide voice communications in the form of compressed digital audio. The compressed digital audio is transmitted and received by the communications units 101–107 via the wireless communication resources 113. In accordance with the TDM nature of the communication system 100, the wireless communication resources 113 comprise time slots established on the RF carrier 117. In a preferred embodiment, the RF carrier 117 comprises a pair of RF channels, one for inbound communications and another for outbound communications. For example, a MIRS™ wireless communication system by Motorola, Inc. subdivides a single 25 KHz RF channel into 6 repeating time slots. Operation and use of a TDM system is described in U.S. Pat. No. 4,754,450 entitled TDM COMMUNICATION SYSTEM FOR EFFICIENT SPECTRUM UTILIZATION by Lynk, Jr. et al., which is hereby incorporated by reference verbatim.

When a communication unit 101–107 of the communication group 108 makes a group call, the communication is heard by all members of the communications group 108. This is accomplished through the exclusive use, at least for the duration of the group call, of a wireless communication resource 113. Group calls for other communication groups in the communication system 100 occur on different wireless communications resources 113 to provide "privacy" to each communications group.

The base stations/repeaters 109, under the control of the central controller 110, are used to transmit a group call to all members of the communication group 108. The base stations/repeaters 109 (for example, MIRS™ base stations by Motorola, Inc.) consist of an RF receiver that receives communications via the wireless communication resources 113 and an RF transmitter that transmits communications via the wireless communication resources 113. Practitioners in the art will recognize that multiple sets of base stations/repeaters can be provided within the communication system 100 to establish multiple RF carriers, each having multiple wireless communication resources in the form of time slots.

In establishing group calls, the central controller 110, which can be a SMARTZONE™ Controller by Motorola, Inc., determines which wireless communications resources 113 are not currently being utilized. As group call requests are received, via the base stations/repeaters 109, the central controller 110 allocates an unused wireless communication resource for use in the group call and instructs members of the desired communication group to use the allocated wireless communications resource for the group call. For the purposes of illustration, it is hereinafter assumed that the wireless communication resources 113 are outbound only, and that a similar set of inbound wireless communication resources (not shown) are also provided. Thus, when an outbound wireless communication resource 113 is allocated, it is also assumed that an inbound wireless communication resource is likewise allocated. Control information transmitted and received by the central controller 110 via a separate control channel, such as dedicated time slots.

As noted above, the communication group 108 includes, in addition to the junior members 101–103, senior members 104–107 which make up a higher level senior communication group 111. Additionally, the executive members 106–107 of the senior members 104–107 represent a yet higher level executive communication group 112. In a preferred embodiment, members of the senior and executive communication groups 111–112 can receive communications intended for the communication group 108. Conversely, junior members 101–103 cannot receive communications established for either the senior or executive communication groups 111–112; and senior members 104–105 not part of the executive communication group 112 cannot receive communications established for the executive communication group 112. However, the present invention allows members of the senior and executive communication groups 111–112 to participate in multiple group calls, as described below.

Figure 2:
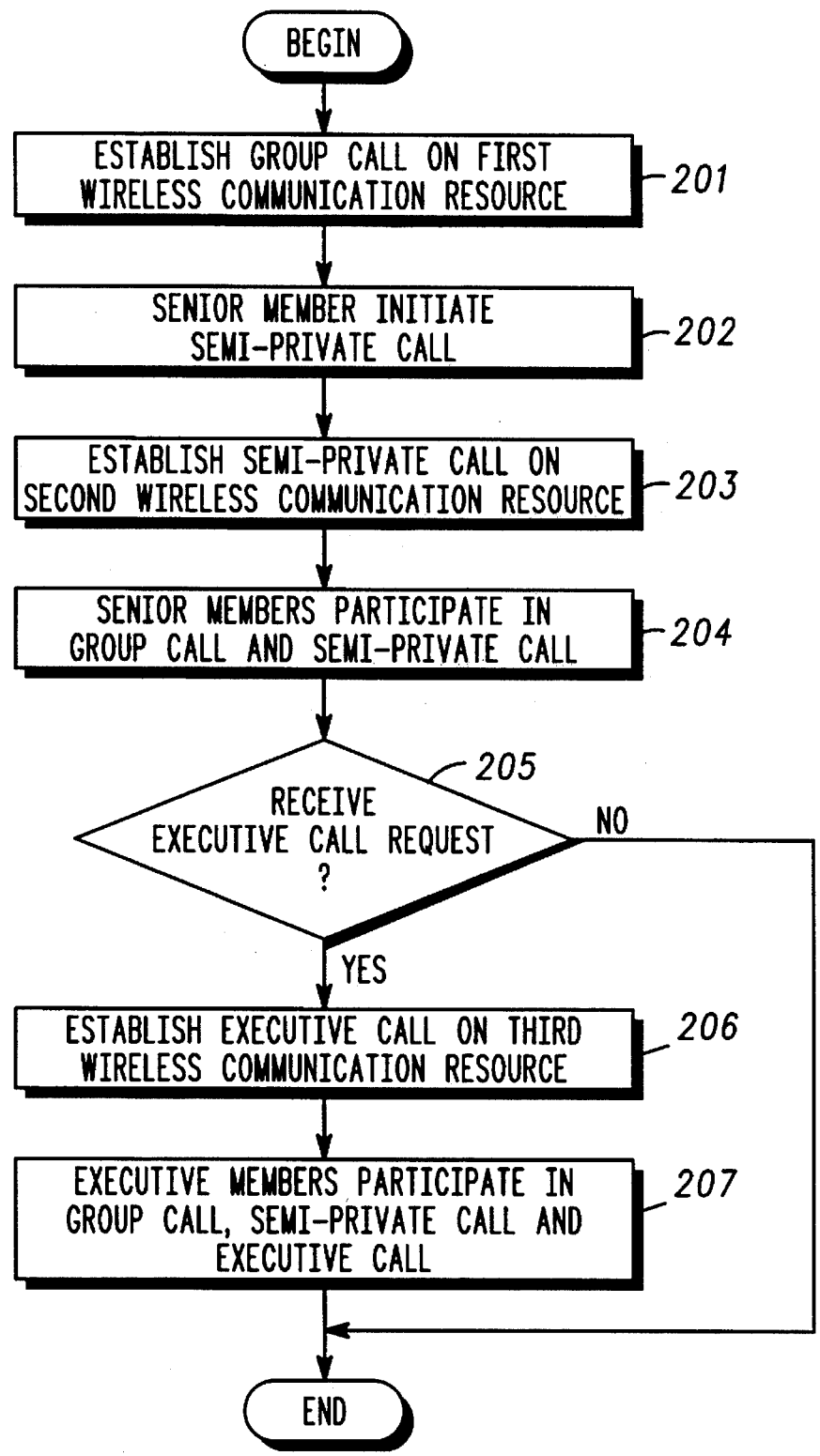
FIG. 2 is a flow chart of a method for a senior member and an executive member to participate in multiple calls.

FIG. 2 illustrates a method for a senior member and an executive member to participate in multiple calls. The method described herein is implementable as software routines, stored in memories (not shown) and executed by microprocessors (not shown) resident in the communication units 101–107 and central controller 110. This method is applicable to any communication system in which a hierarchy of communication groups is desired, e.g., the law enforcement agency example given above. At step 201, the establishment of a group call begins when a communication unit 101 transmits a group call request to the central controller 110. The group call request includes an indication of the communication group intended to participate in the group call; for example, the communication group designated by reference numeral 108.

Continuing step 201, the central controller 110 checks for available communications resources 109 and allocates an unused wireless communications resource 113 to the communication group 108; for example, a first wireless communication resource (time slot) 114 is allocated to the communication group 108. As noted above, a corresponding inbound wireless communication resource is also allocated. All members of the communication group 108 are instructed by the central controller 110 that the first wireless communication resource 114 is to be used for the group call. The ensuing group call includes the junior members 101–103 and the senior members 104–107 (including the executive members 106–107 by default). As known in the art, the first wireless communication resource 114 is de-allocated when the group call is complete.

While the group call established at step 201 is ongoing, a senior member 104–107 initiates, at step 202, a semi-private call for the senior communication group 111. This is accomplished by the senior member (e.g., the communication unit having reference numeral 104) sending a semi-private call request to the central controller 110. Transmission of the semi-private call request can be initiated via a special button or a menu selection on the senior member 104. For example, a supervisory officer (senior member) may wish to participate in communications with patrolmen (junior members) while at the same time conduct further communications only with other supervisory officers (additional senior members).

Upon receipt of the semi-private call request at step 203, the central controller 110 attempts to establish the semi-private call. In the context of the present invention, a semi-private call is a reduced-audience version of a group call; the "semi-private" aspect arises from it's exclusion of other communication units (i.e., the junior members 101–103) in the communication group. As with the group call, the central controller 110 determines if additional wireless communication resources 113 are available. If additional wireless communication resources 113 are not available, the semi-private group call request is either denied or delayed, pending availability of resources. Assuming available wireless communication resources 113, the central controller 110 allocates a second wireless communication resource (time slot) 115, including a corresponding inbound resource. The central controller 110 notifies the senior communication group 111 that a semi-private call has been established on the second wireless communication resource 115. In order for any given communication unit to participate in the semi-private call, it is required that the communication unit have received the allocation information regarding the second wireless communication resource 115. This is accomplished using known programming techniques for programming a communication unit.

At step 204, the senior members 104–107 participate in the group call and the semi-private call. In a preferred embodiment, reception of the group call and the semi-private call is accomplished by having the senior members 104–107 extract and reconstruct the compressed digital audio transmitted in both the first and second wireless communication resources 114–115, i.e., the group call and the semi-private group call. The resulting audio information from each call is summed together for presentation.

In order to transmit with respect to the group call or the semi-private call, the senior members 104–107 can individually select whether to use either the first or second wireless communication resources 114–115. For example, if a senior member 104 wants to communicate with the entire communication group 108, a selection of the group call (via a menu selection, for instance) will cause transmissions to be placed on the inbound complement to the first wireless communication resource 114. Likewise, transmissions intended only for the senior communication group 111 are placed on the inbound complement to the second wireless communication resource 115.

If, at step 205, an executive call request is not received, the group call and the semi-private call proceed until completion, allowing the senior members 104–107 to participate in both the group call and the semi-private call. If, however, an executive call request is received, processing continues at step 206. An executive call request, sent by a member of the executive communication group 112 (e.g., the communication unit having reference numeral 106), can be initiated in the same manner as the semi-private call request, i.e., use of a special button or menu selection. Again using the law enforcement example, the chief of police (an executive member), wanting to coordinate strategy with his district commanders (other executive members) would initiate an executive call while constantly monitoring communications between the patrolmen (junior members in the group call) and supervisory officers (senior members in the semi-private call).

Upon receipt of the executive call request at step 206, the central controller 110 attempts to establish the executive call. Similar to the relationship between a semi-private call and a group call, an executive call, in the context of the present invention, is a reduced-audience version of a semi-private call. The central controller 110 determines if additional wireless communication resources 113 are available. If additional wireless communication resources 113 are not available, the semi-private group call request is either denied or delayed, pending availability of resources. Assuming available wireless communication resources 113, the central controller 110 allocates a third wireless communication resource (time slot) 116, including a corresponding inbound resource. The central controller 110 notifies the executive communication group 112 that an executive call has been established on the third wireless communication resource 116. Once again, communication units that do not receive the notification of the executive call from the central controller 110 are not allowed to participate in the executive call.

At step 207, having established the executive call, the initiating executive member 106 can begin transmitting to the entire communication group 108, to the senior and executive communication groups 111–112 only, or strictly to the executive communication group 112. The choice of audience for future transmissions is accomplished using a similar selection method as described above. Also, the summing technique described previously is similarly incorporated to allow executive members to simultaneously monitor group, semi-private, and executive calls.

During this time, members of the executive communication group 112 can participate in the executive call using the inbound complement to the third wireless communication resource 116. However, junior members 101–103 cannot participate in the semi-private call of the senior communication group 111 or the executive call of the executive communication group 112. Also, the senior members 104–105 not belonging to the executive communication group 112 are not involved in the executive call. This type of hierarchical system operation allows all levels of the organizations to be in constant communication while simultaneously allowing higher level groups to communicate among themselves. This was not possible in prior art communication systems. As an additional feature of the present invention, junior members 101–103 can be temporarily "promoted", thus allowing them to participate in higher level communications.

Figure 3:
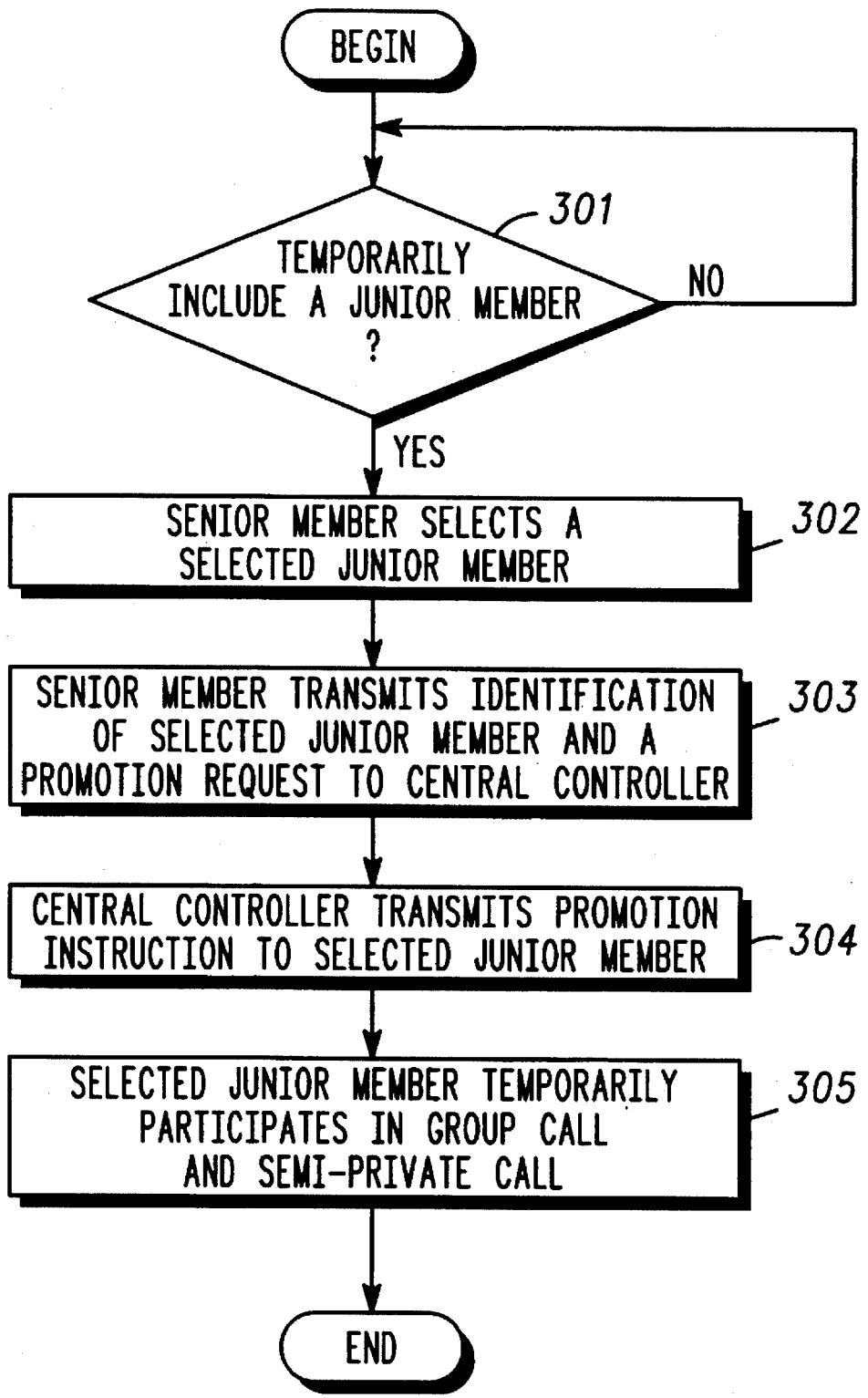
FIG. 3 is a flow chart of a method for temporarily promoting a junior member.

FIG. 3 illustrates a method whereby a junior member may be temporarily selected to participate in a semi-private call. As with the method of FIG. 2, this method is implementable as software routines in the communication units 101–107 and central controller 110. At step 301, a determination is made by a member of the senior communication group 111 to include a junior member 101–103 in an ongoing semi-private call. This could be a result of a specific expertise possessed by the selected junior member involving the given situation that is critical to determining a course of action. For example, a specific officer may have the most recent hazardous material training regarding a specific substance involved in an accident.

At step 302, having determined a selected junior member, the senior member enters the identification (ID) or alias of the selected junior member. Entry of the ID or alias is accomplished using a menu selection technique or keypad entry. At step 303, a promotion request and the ID or alias of the selected junior member are sent to the central controller 110 via the appropriate control information resource. The promotion request serves to notify the central controller 110 that the communication unit corresponding to the ID or alias is to be allowed to participate in the semi-private call.

In response to the promotion request, at step 304, the central controller 110 verifies that the selected junior member is currently operating within the system. If the selected junior member is operating within the system, the central controller sends a promotion instruction to the selected junior member via the control resource. The promotion instruction also includes identification of the wireless communication resource used for the semi-private call. In this manner, the selected junior communication unit is notified of the semi-private call and of its temporary promotion.

At step 305, the selected junior member participates in the semi-private call, as well as any group calls. Senior members 104–107 can be notified during the current and subsequent semi-private calls that a selected junior member is part of the senior communication group 111. The "promoted" status of the selected junior member is continued until a senior member "demotes" the selected junior member back to his original status. Such a demotion is accomplished using a demotion instruction sent by the central controller 110 in response to a demotion request from a senior member.

The present invention provides a method for senior members and executive members of a communication group to simultaneously participate in multiple group calls. With such a method, members of senior and executive communication groups do not have to leave an ongoing group call to communicate privately with other senior and/or executive members. In prior art systems, these activities were considered separate and distinct, and thus not possible to perform both simultaneously. Through the use of multiple wireless communication resources in the form of TDM time slots, the present invention allows senior and executive members to participate in multiple calls.

We claim:

1. In a wireless communication system that includes a plurality of communication units arranged into at least one communication group, a plurality of wireless communication resources, and a central controller that allocates the plurality of wireless communication resources among the plurality of communication units, a method for senior members of the at least one communication group to participate in a group call for the at least one communication group and a semi-private call simultaneously, the method comprising the steps of:

a) participating in the group call on a first wireless communication resource of the plurality of wireless communication resources, the first wireless communication resource comprising a first time slot on a radio frequency carrier;

b) initiating, by a senior member of the senior members, the semi-private call for at least one other senior member of the senior members; and c) participating, by the senior member and the at least one other senior member, in the semi-private call and the group call when the semi-private call has been established on a second wireless communication resource of the plurality of wireless communication resources, the second wireless communication resource comprising a second time slot on the radio frequency carrier.

2. The method of claim 1, further comprising the steps of:

d) initiating, by an executive member of the senior members, an executive call for at least one other executive member of the senior members; and e) participating, by the executive member and the at least one other executive member, in the executive call, the semi-private call, and the group call when the executive call has been established on a third wireless communication resource of the plurality of wireless communication resources, the third wireless communication resource comprising a third time slot on the radio frequency carrier.

3. The method of claim 1, further comprising the steps of:

d) selecting, by the senior member, a junior member of the at least one communication group to participate in the semi-private call, to produce a selected junior member; and e) transmitting, by the senior member, an identification of the selected junior member and a promotion request to the central controller.

4. The method of claim 1, further comprising the steps of:

d) selecting, by the at least one other senior member, a junior member of the at least one communication group to participate in the semi-private call, to produce a selected junior member; and e) transmitting, by the at least one other senior member, an identification of the selected junior member and a promotion request to the central controller.

5. In a wireless communication system that includes a plurality of communication units arranged into at least one communication group, a plurality of wireless communication resources, and a central controller that allocates the plurality of wireless communication resources among the plurality of communication units, a method for the central controller to establish a group call for the at least one communication group and a semi-private call for senior members of the at least one communication group simultaneously, the method comprising the steps of:

a) receiving a group call request from a communication unit of the at least one communication group;

b) establishing the group call on a first wireless communication resource of the plurality of wireless communication resources, the first wireless communication resource comprising a first time slot on a radio frequency carrier;

c) receiving a semi-private call request from a senior member of the senior members; and d) establishing a semi-private call on a second wireless communication resource of the plurality of wireless communication resources, the second wireless communication resource comprising a second time slot on the radio frequency carrier.

6. The method of claim 5, further comprising the steps of:

e) receiving, from an executive member of the senior members, an executive call request for at least one other executive member of the senior members; and f) establishing an executive call on a third wireless communication resource of the plurality of wireless communication resources, the third wireless communication resource comprising a second time slot on the radio frequency carrier.

7. The method of claim 5, further comprising the steps of:

e) receiving an identification of a selected junior member of the at least one communication group and a promotion request from the senior member; and f) transmitting, by the central controller, a promotion instruction to the selected junior member.

8. The method of claim 5, further comprising the steps of:

e) receiving an identification of a selected junior member of the at least one communication group and a promotion request from the at least one other senior member; and f) transmitting, by the central controller, a promotion instruction to the selected junior member.

9. In a wireless communication system that includes a plurality of communication units arranged into at least one communication group, a plurality of wireless communication resources, and a central controller that allocates the plurality of wireless communication resources among the plurality of communication units, a method for senior members of the at least one communication group to participate in a group call for the at least one communication group and a semi-private call simultaneously, the method comprising the steps of:

a) establishing, by the central controller, the group call on a first wireless communication resource of the plurality of wireless communication resources, the first wireless communication resource comprising a first time slot on a radio frequency carrier;

b) participating, by the senior members and junior members of the at least one communication group, in the group call;

c) initiating, by a senior member of the senior members, a semi-private call for at least one other senior member of the senior members;

d) establishing, by the central controller, the semi-private call on a second wireless communication resource of the plurality of wireless communication resources, the second wireless communication resource comprising a second time slot on the radio frequency carrier; and e) participating, by the senior member and the at least one other senior member, in the semi-private call and the group call.

10. The method of claim 9, further comprising the steps of:

f) initiating, by an executive member of the senior members, an executive call for at least one other executive member of the senior members;

g) establishing, by the central controller, the executive call on a third wireless communication resource of the plurality of wireless communication resources, the third wireless communication resource comprising a third time slot on the radio frequency carrier; and h) participating, by the executive member and the at least one other executive member, in the executive call, the semi-private call, and the group call.

11. The method of claim 9, further comprising the steps of:

f) selecting, by the senior member, a junior member to participate in the semi-private call, to produce a selected junior member;

g) transmitting, by the senior member, an identification of the selected junior member and a promotion request to the central controller;

h) transmitting, by the central controller, a promotion instruction to the selected junior member; and i) upon receiving the promotion instruction, participating, by the selected junior member in the group call and the semi-private call.

12. The method of claim 9, further comprising the steps of:

f) selecting, by the at least one other senior member, a junior member to participate in the semi-private call, to produce a selected junior member;

g) transmitting, by the at least one other senior member, an identification of the selected junior member and a promotion request to the central controller;

h) transmitting, by the central controller, a promotion instruction to the selected junior member; and i) upon receiving the promotion instruction, participating, by the selected junior member in the group call and the semi-private call.

* * * * *